(12) United States Patent
Viesselmann et al.

(10) Patent No.: US 6,928,792 B1
(45) Date of Patent: Aug. 16, 2005

(54) NET MATERIAL FEEDING AND CUTTING SYSTEM FOR AN AGRICULTURAL ROUND BALER

(75) Inventors: Kim P. Viesselmann, Grafton, WI (US); Scott V. Grahl, St. Cloud, WI (US); Carl S. Silbernagel, Rhinelander, WI (US); Anthony J. Glaszcz, Hartford, WI (US)

(73) Assignee: Gehl Company, West Bend, WI (US)

( * ) Notice: Subject to any disclaimer, the term of this patent is extended or adjusted under 35 U.S.C. 154(b) by 0 days.

(21) Appl. No.: 10/326,520

(22) Filed: Dec. 20, 2002

(51) Int. Cl.⁷ .............................................. B65B 53/04
(52) U.S. Cl. .................... 53/430; 220/554.2; 220/557; 53/567
(58) Field of Search .............................. 242/554.2, 557, 242/535.4; 83/649, 949; 53/399, 430, 452, 53/473, 450, 52, 552, 513, 567

(56) References Cited

U.S. PATENT DOCUMENTS 5,129,207 A    7/1992   Butler

*Primary Examiner*—John Paradiso
(74) *Attorney, Agent, or Firm*—Boyle, Fredrickson, Newholm, Stein & Gratz, S.C.

(57) ABSTRACT

A wrap material dispensing system for a round baler includes a wrap material drive system for advancing wrap material from a supply roll to a wrap material feeding arrangement, and a selectively operable knife mechanism for severing the wrap material. The wrap material drive arrangement includes a pair of rollers that are driven by a motor. The knife mechanism is mounted to a pivotable shaft to which a one-way knife actuating clutch is mounted. A flexible drive member, such as a chain, is engaged with a rotatable output member of the drive motor, and with the one-way knife actuating clutch and a driven one of the wrap material drive rollers. Operation of the motor to rotate the motor output member in a first direction causes advancement of the wrap material, and the one-way knife actuating clutch is configured to maintain the knife mechanism in an inoperable rest position during advancement of the wrap material. When a desired amount of wrap material has been dispensed, the motor is operated to rotate the motor output member in a second direction opposite the first direction, to engage the one-way knife actuating clutch and to move the knife mechanism from the inoperative rest position to an operative cutting position, to sever the wrap material. The wrap material drive roller includes an overrunning clutch that allows rapid advancement of the wrap material when the wrap material is engaged with the wrap material feeding arrangement, and which enables the motor to be operated to rotate the motor output member in the second direction while the wrap material is being dispensed, to sever the wrap material by operation of the knife mechanism.

16 Claims, 7 Drawing Sheets

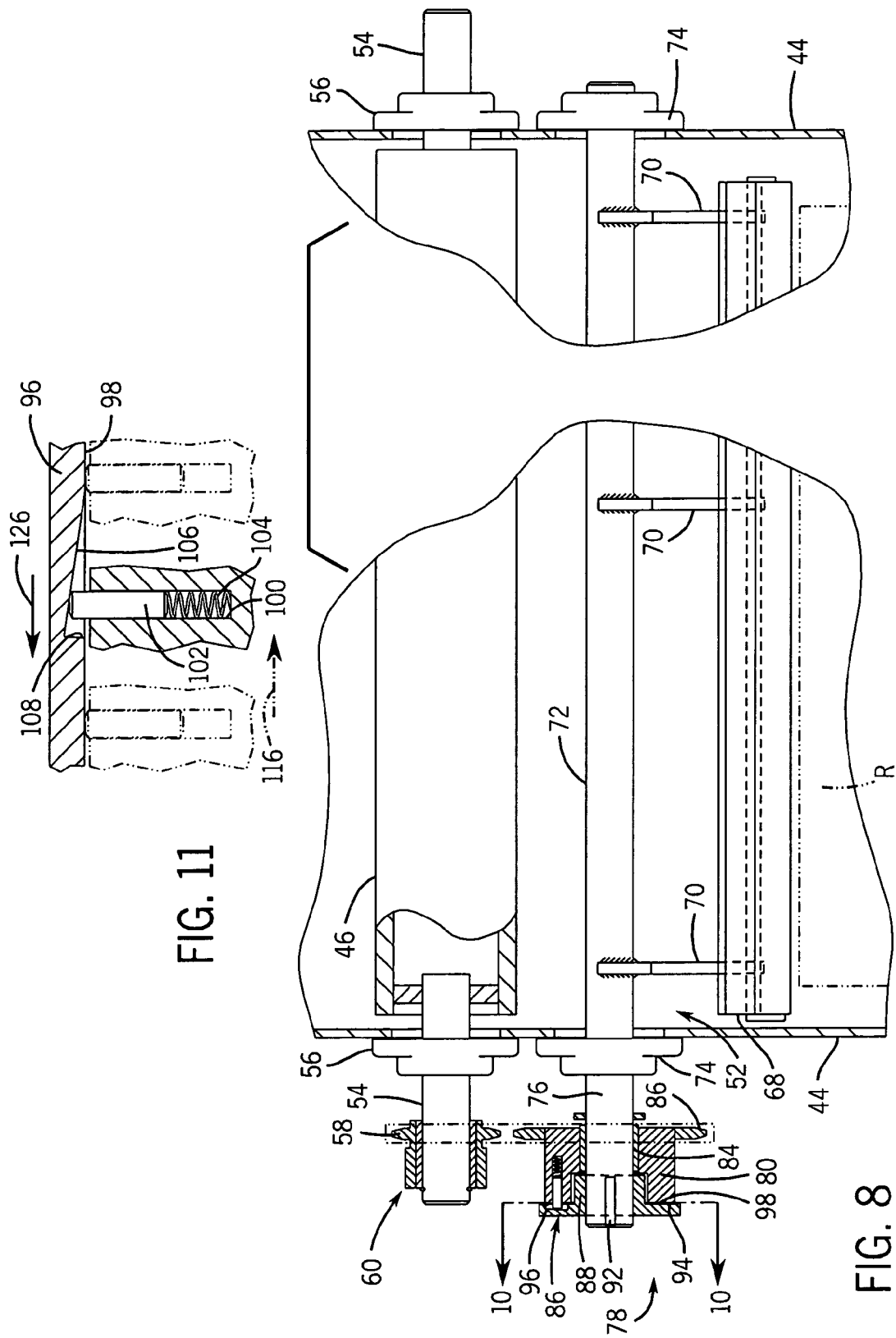

NET MATERIAL FEEDING AND CUTTING SYSTEM FOR AN AGRICULTURAL ROUND BALER

BACKGROUND AND SUMMARY OF THE INVENTION

This invention relates to a round baler such as for use in forming round bales of agricultural crop material, and more particularly to a system for dispensing net or mesh-type wrap material onto a completed bale.

A baler for forming round bales of agricultural crop material includes a system for wrapping a completed bale to hold the bale together during transportation and storage. Typically, round bales are wrapped with either twine or net or mesh-type wrap material. The present invention has to do with applying a net or mesh-type wrap material to a completed bale.

A prior art wrap material dispensing system is disclosed in Butler U.S. Pat. No. 5,129,207 issued Jul. 14, 1992, the disclosure of which is hereby incorporated by reference. The '207 patent illustrates a wrap material dispensing system in which a series of wrap material conveying belts face and engage the baler belts. The end of the wrap material is supplied to a pinch point between the baler belts and the conveying belts, and the wrap material is advanced between the baler belts and the conveying belts to introduce the end of the net material into the bale-forming chamber of the baler. The wrap material is then caught on the bale, and rotates along with the bale to wrap the bale. A knife is actuated when a desired amount of wrap material has been wrapped onto the bale, to sever the wrap material. The wrapped bale is then discharged from the baler in preparation for forming a subsequent bale.

The system disclosed in the '207 patent utilizes an extendible and retractable linear actuator to advance the end of the wrap material to the pinch point between the baler belts and the conveying belts, and to move the knife between its operative and inoperative positions. While this system functions satisfactorily to advance the wrap material and to sever the wrap material, the system involves certain drawbacks in the use of the wrap material conveying belt assembly, which adds to the overall cost of the system and involves a number of moving parts that require maintenance. Further, the use of a linear actuator to advance the end of the wrap material requires the linear actuator to have a relatively long stroke, which increases its cost and also occupies a significant amount of space in the interior of the housing of the wrap material dispensing system. Further, the range of advancement of the end of the wrap material is finite due to the stroke of the linear actuator, which required the use of the conveying belt assembly to advance the end of the wrap material to the pinch point between the baler belts and the conveying belts.

It is an object of the present invention to provide a wrap material dispensing system for an agricultural round baler which eliminates the finite wrap material advancement of the prior art system, and which provides a more efficient and cost effective system for dispensing the wrap material onto a completed bale. It is a further object of the invention to provide such a system which combines the wrap material advancement and cutting mechanisms. Yet another object of the invention is to provide such a wrap material dispensing system which utilizes a unique motor drive system for advancing and cutting the wrap material. A still further object of the invention is to provide such a wrap material dispensing system having a relatively small number of parts, to reduce the overall part count of the system and thereby the overall cost and maintenance of the system. Yet another object of the invention is to provide such a system which is relatively simple in its construction and incorporation into a round baler.

In accordance with the present invention, a wrap material dispensing system for an agricultural baler includes a motor-driven advancing arrangement with which the wrap material is engaged and which is operable to advance the wrap material to a wrap material feeding arrangement associated with the baler. Representatively, the wrap material feeding arrangement may be in the form of a series of bars that are in alignment with spaces between adjacent belts of the baler, and which are configured to form an entry area for the wrap material. Operation of the drive arrangement functions to advance the leading end of the wrap material toward the entry area, to enable the wrap material to be engaged with the baler belts to advance the wrap material into the bale-forming chamber for application to the bale.

The wrap material dispensing system of the present invention includes a cutting arrangement which is selectively operable to cut the wrap material when a desired amount of wrap material has been dispensed onto the bale. The cutting arrangement includes a knife member, which is movable between an inoperative or rest position, in which the knife member is located out of the path of the wrap material, and a cutting position in which the knife member is moved into the path of the wrap material to sever the wrap material.

The motor-driven wrap material advancing arrangement is operable in a first direction to advance the wrap material toward the entry area of the wrap material feeding arrangement, and is movable in a second direction opposite the first direction to move the knife member from its rest position to its cutting position. The knife member is preferably mounted to a pivotable actuator shaft, and a one-way knife actuating clutch arrangement is interconnected between the pivotable actuator shaft and the drive arrangement. The one-way clutch arrangement is inoperative when the drive arrangement is operated in the first direction to advance the wrap material, to maintain the knife member in its rest position. When the drive arrangement is operated in the second direction, the one-way clutch arrangement engages so as to cause movement of the knife member from its rest position to its cutting position.

The motor-driven advancing arrangement is preferably in the form of a motor having a rotatable output member, which is driven in either a first direction of rotation or a second direction of rotation by the motor so as to control the direction of the advancing arrangement and thereby movement of the knife member. The wrap material advancing arrangement preferably includes a pair of nip rollers, at least one of which is driven by operation of the motor through engagement of a flexible drive member, such as a chain, between the motor output member and the nip roller. An overrunning clutch is engaged between the driven nip roller and the flexible drive member, to allow rapid advancement of the wrap material when the wrap material is engaged with the baler belts. In this manner, the motor can be operated to rotate the rotatable output member in the second direction while the wrap material is being advanced, so as to move the knife member to its cutting position and to thereby sever the wrap material when a desired amount of wrap material has been applied to the bale.

The invention contemplates a round baler incorporating a wrap material dispensing system as set forth above, as well as an improvement in a wrap material dispensing system and a method of applying wrap material to a bale, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 8 is a partial section view taken along line 8—8 of FIG. 6;

FIG. 11 is a partial section view taken along line 11—11 of FIG. 10;

DETAILED DESCRIPTION OF THE INVENTION

Figure 1:
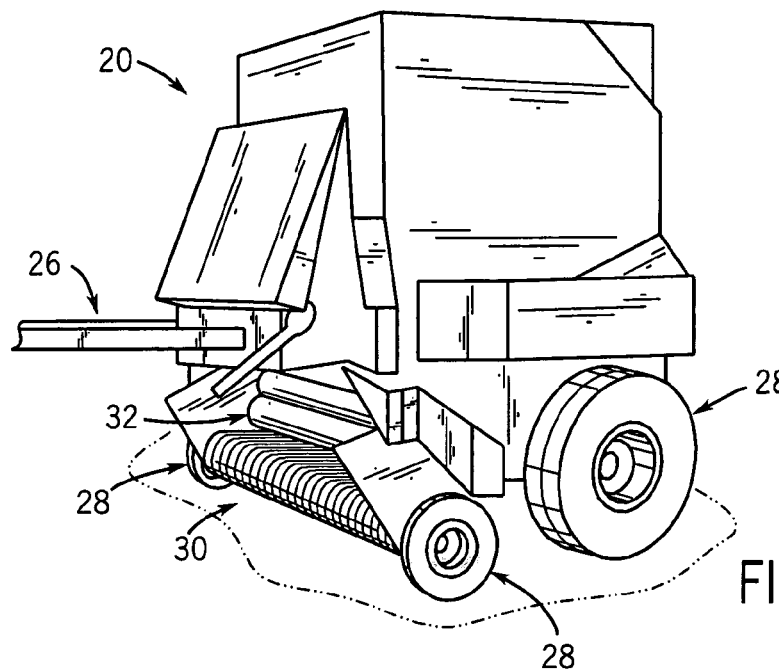
FIG. 1 is an isometric view of a round baler incorporating the wrap material dispensing system of the present invention.

With reference to FIGS. 1–3 and 5, a round baler 20 including the wrap material dispensing system of the present invention includes a series of side-by-side belts 22 that cooperate to define an internal bale-forming chamber 24 within which a round bale of agricultural crop material is adapted to be formed. Baler 20 includes a tongue 26 adapted to be engaged with a tow vehicle such as a tractor, and a pair of wheels 28 which allow baler 20 to move along the ground behind the tow vehicle. A pickup mechanism 30 is adapted to lift crop material off the ground and to supply the crop material rearwardly to a crop inlet 32, which enables the crop material to pass into bale-forming chamber 24. In a known manner, operation of belts 22 functions to form the crop material into a round bale within bale-forming chamber 24 upon operation of baler 20.

Baler 20 includes a tailgate 34 with which baler belts 22 are engaged. Tailgate 34 is movable between a closed position as shown in the drawing figures, and an open position to enable a formed bale to be discharged from baler 20, again in a known manner. Tailgate 34 is maintained in its closed position during bale formation, and is moved to its open position so as to allow a formed bale to be discharged from bale-forming chamber 24.

Figure 2:
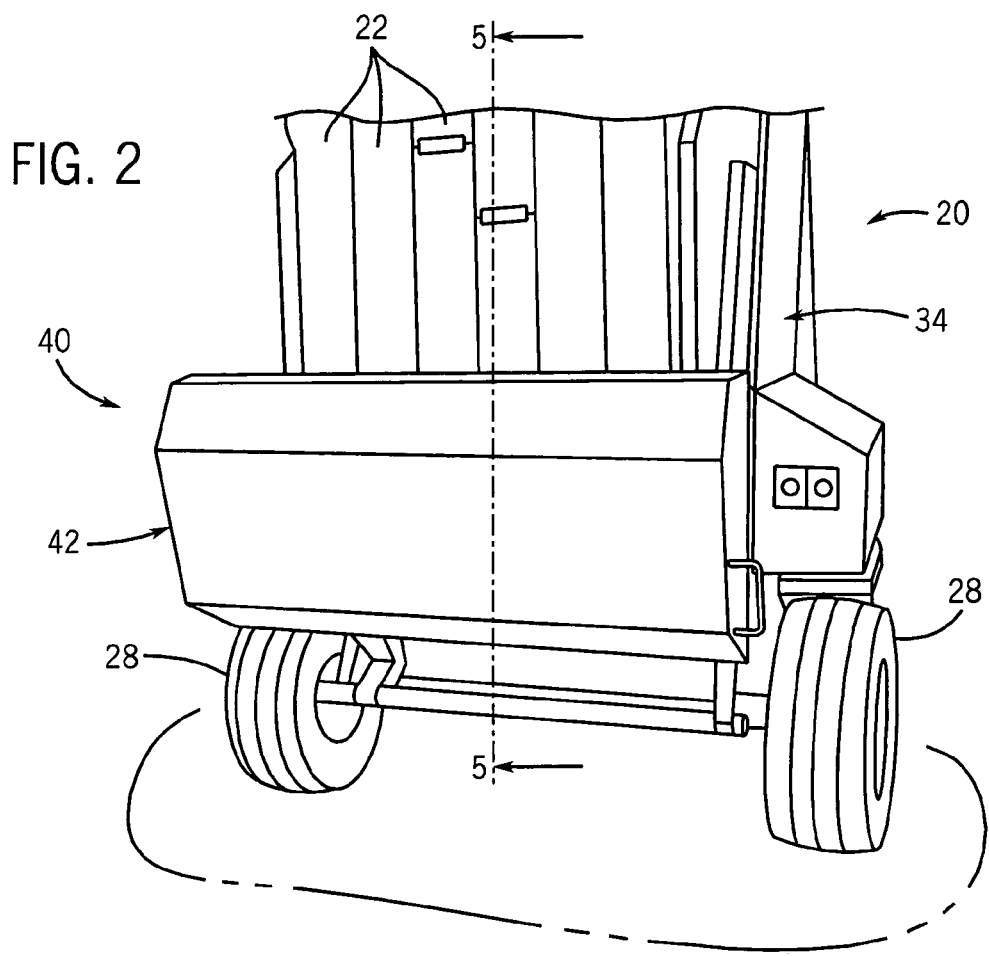
FIG. 2 is a partial rear isometric view showing a portion of the round baler of FIG. 1 and a housing within which the wrap material dispensing system of the present invention is contained.
Figure 3:
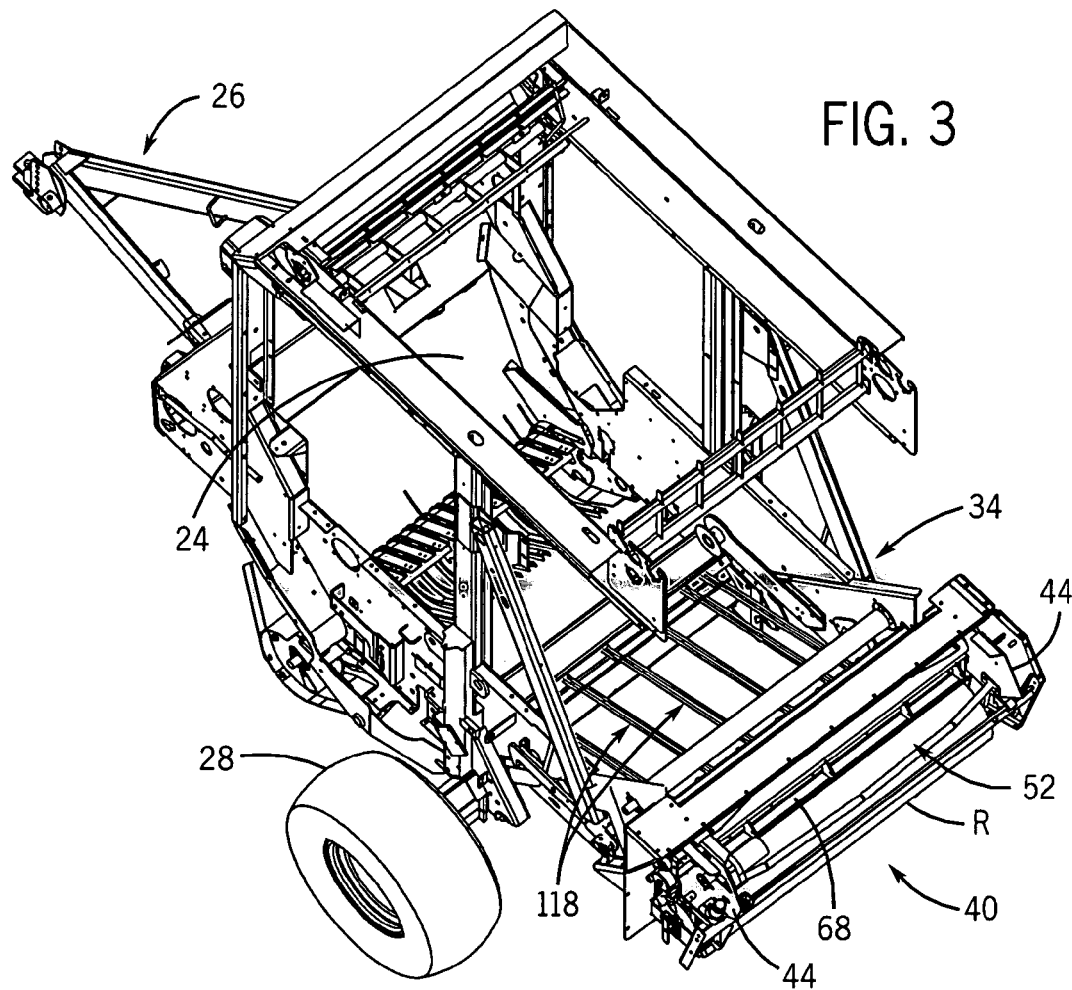
FIG. 3 is an isometric view illustrating a frame incorporated in the round baler of FIGS. 1 and 2 and the components of the wrap material dispensing system of the present invention.

A wrap material dispensing system constructed according to the present invention, shown at 40, is mounted to tailgate 34 for supplying mesh or net-type wrap material to a bale after the bale has been fully formed in bale-forming chamber 24. As shown in FIG. 2, wrap material dispensing system 40 is enclosed within a housing 42 which is mounted to tailgate 34.

Figure 4:
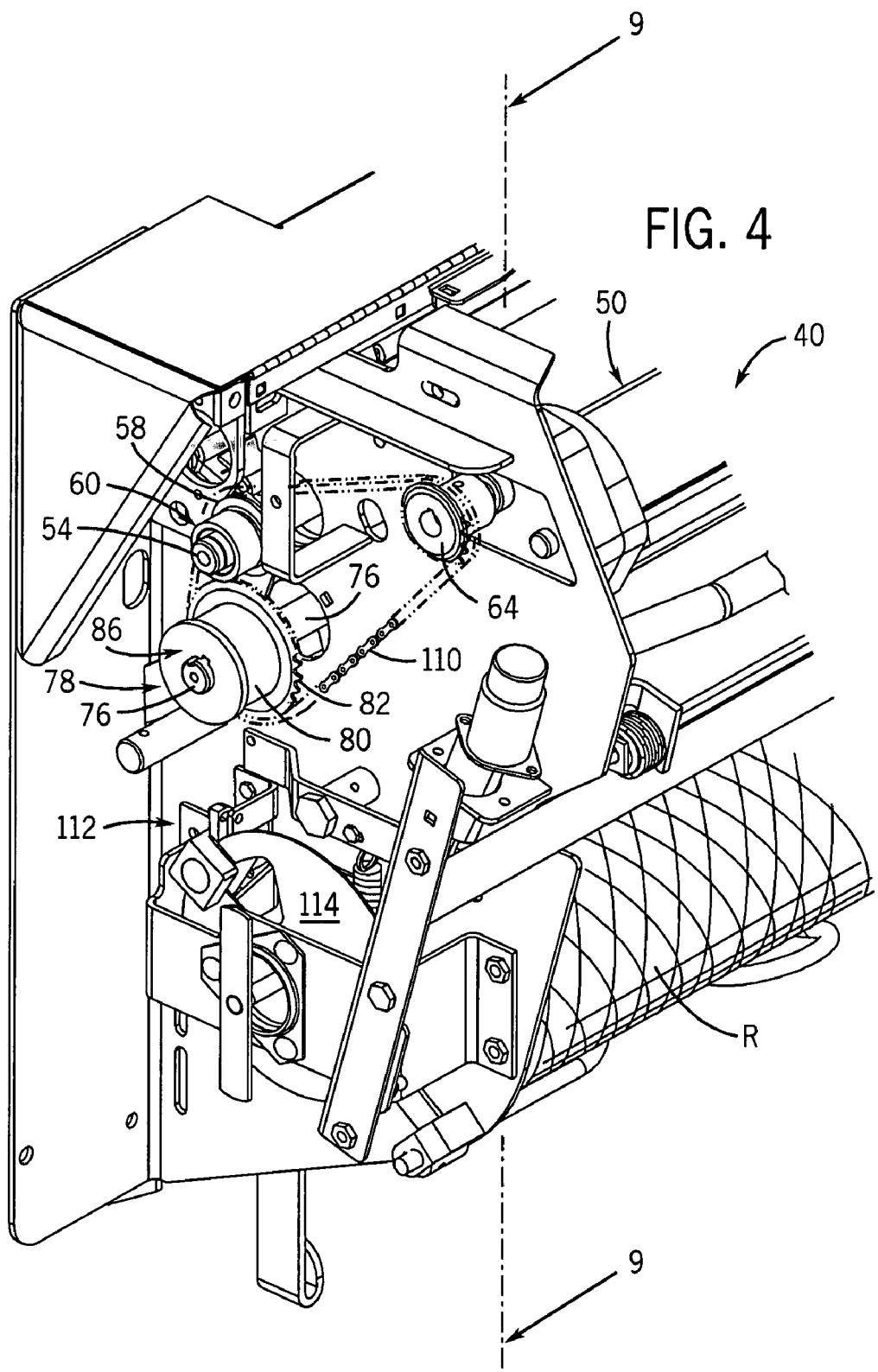
FIG. 4 is a partial isometric view illustrating the end portion of the wrap material advancing arrangement incorporated in the wrap material dispensing system of the present invention.
Figure 5:
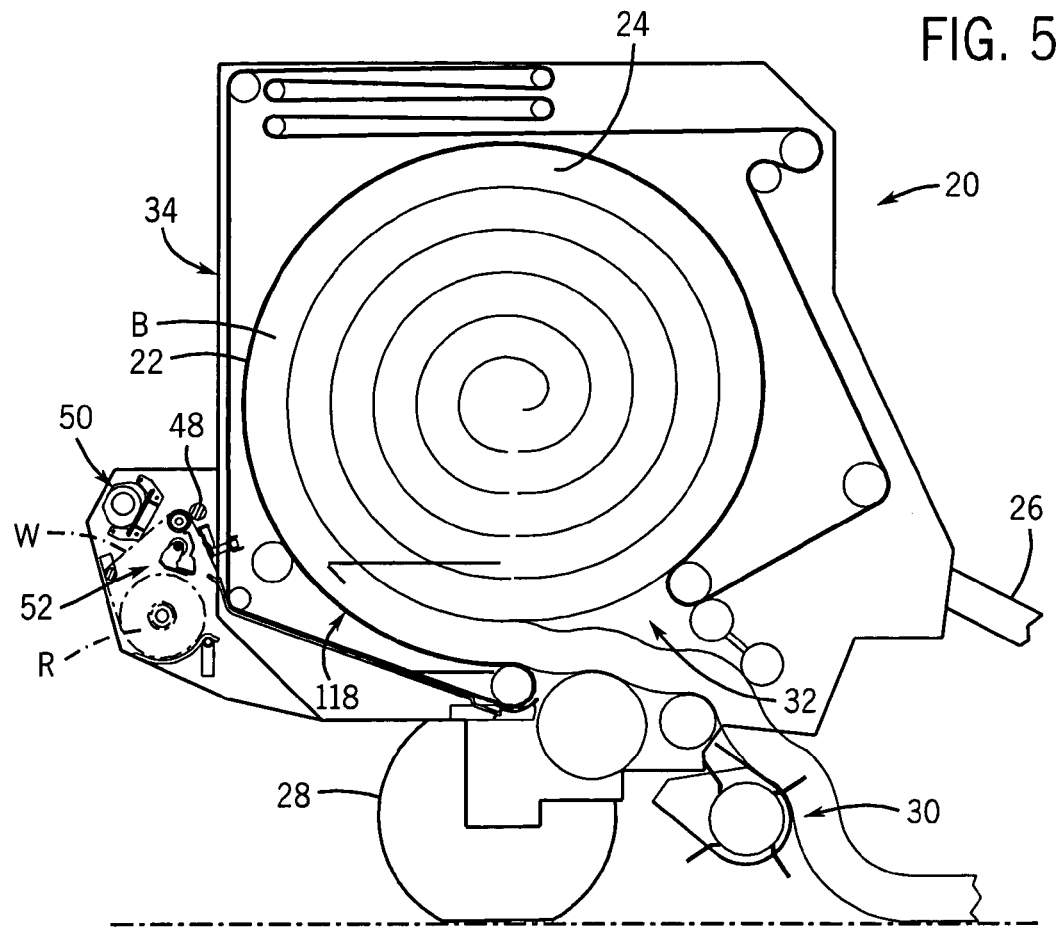
FIG. 5 is a section view showing the interior of the round baler of FIG. 1, incorporating the wrap material dispensing system of the present invention.
Figure 6:
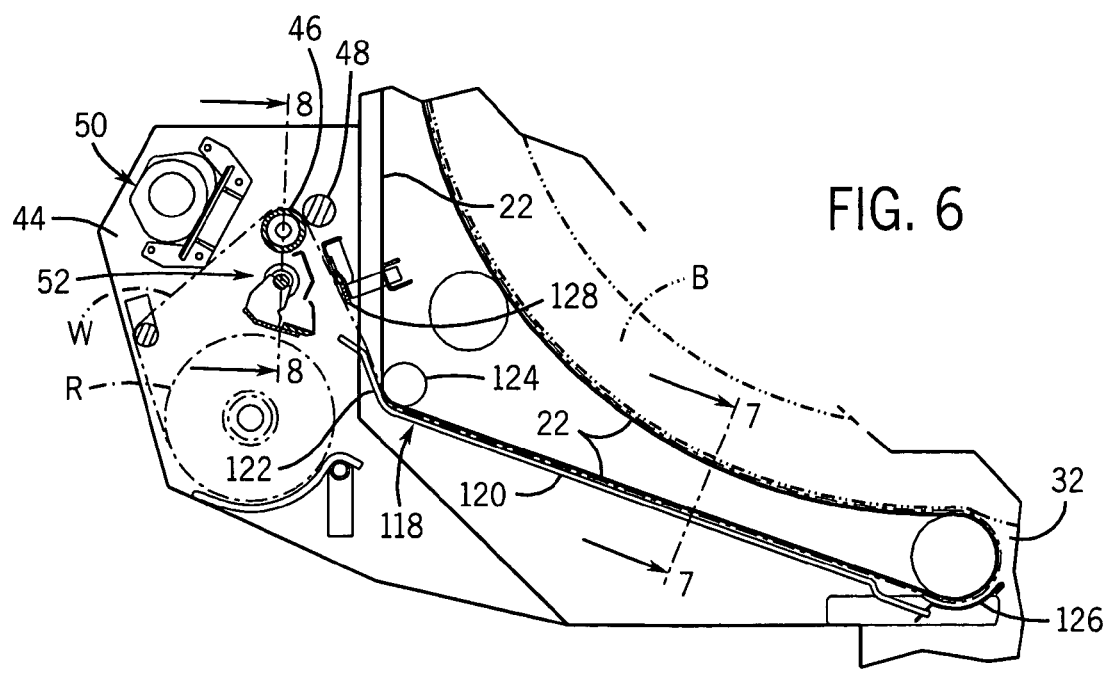
FIG. 6 is an enlarged partial section view showing a portion of the round baler interior as in FIG. 5 and the components of the wrap material dispensing system of the present invention.

Referring to FIGS. 4–6, wrap material dispensing system 40 is adapted to supply a web of wrap material, shown at W, from a roll of wrap material, shown at R. Roll R of wrap material is rotatably supported between a pair of end panels 44, which provides support for roll R as well as the components incorporated in wrap material dispensing system 40.

Wrap material dispensing system 40 of the present invention includes a web advancing arrangement, in the form of a pair of nip rolls 46, 48 rotatably supported between end panels 44, together with a drive motor 50 mounted to one of end panels 44 and a knife assembly 52 pivotably supported between end panels 44.

As shown in FIGS. 4, 6 and 8, nip roll 46 is a driven roll, and is carried by a nip roll shaft 54 supported by bearing assemblies 56 mounted to end panels 44. One end of nip roll shaft 54 extends outwardly beyond its associated bearing 56, and a sprocket 58 is engaged with the extension of nip roll shaft 54 via an overrunning clutch mechanism shown generally at 60.

Nip roll 48 is an idler roll which is engaged with driven nip roll 46 so as to be rotatable in response to rotation of driven nip roll 46, in a manner as is known. Idler nip roll 48 is mounted to and between end panels 44 via suitable bearing assemblies in a known manner. Web W of wrap material is located between and engaged with nip rolls 46, 48.

Motor 50 includes a rotatable output shaft 62 that extends outwardly from end panel 44. A drive sprocket 64 is secured to and rotatable with motor output shaft 62, in a known manner. Motor 50 may representatively be a reversible DC-type motor such as is available from the Fasco Division of Invensys Corporation of Springfield, Mo. under its designation VW84 although it is understood that any other satisfactory type of reversible drive motor may be employed.

Knife assembly 52 includes a knife member 68 carried by a series of knife support arms 70, each of which is mounted at an inner end to a pivotable knife actuator shaft 72. Bearings 74 are mounted to end panels 44, and knife actuator shaft 72 is pivotably or rotatably mounted to bearings 74.

Figure 10:
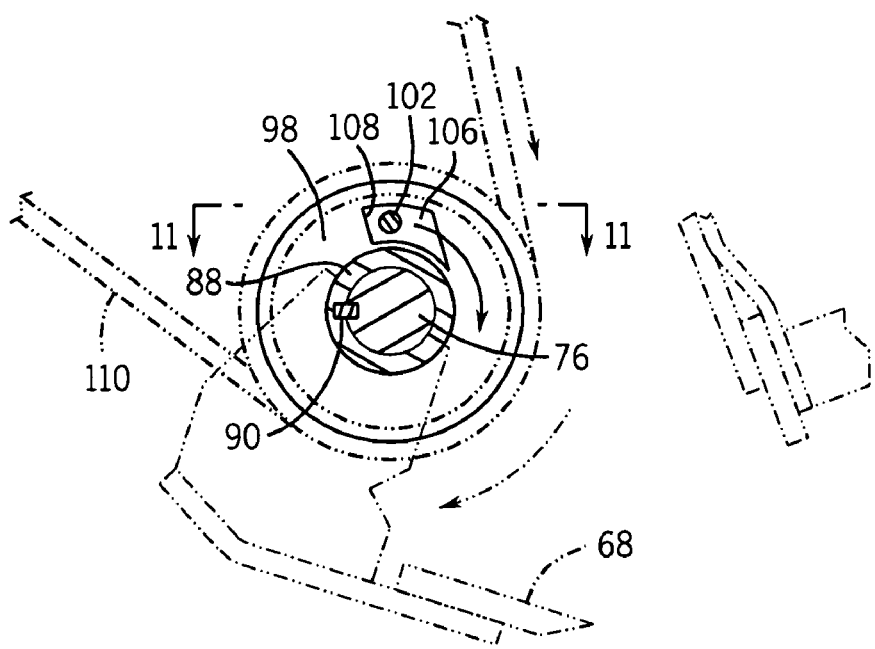
FIG. 10 is a partial section view taken along line 10—10 of FIG. 8.

Knife actuator shaft 72 includes an extension 76, and a knife actuating clutch assembly 78 is mounted to shaft extension 76. As shown in FIGS. 8, 10 and 11, knife actuating clutch assembly 78 is in the form of an axial pin clutch, which includes a generally cylindrical clutch body 80 to which a sprocket 82 is secured. A bushing 84 is located between shaft extension 76 and clutch body 80, such that clutch body 80 is freely rotatable relative to shaft extension 76. Knife actuating clutch assembly 78 further includes a cap member 86 having a collar 88 which defines a passage within which the end portion of shaft extension 76 is received. Cap 86 is non-rotatably mounted to shaft extension 76, such as by means of a key-type connection between collar 88 and shaft extension 76. Clutch body 80 includes a recessed area within which collar 88 is received.

Clutch body 80 defines an annular outwardly facing surface 94, and cap 86 includes an annular outer portion 96 that overlies clutch body outer surface 94, defining an inwardly facing surface 98 which faces outer surface 94.

Clutch body 80 includes a pair of axial passages 100 (FIG. 11) that extend inwardly from body outer surface 94. A spring 104 is located in each passage 100, and bears between an inner end defined by the passage 100 and the facing inner end of pin 102. Spring 104 and pin 102 are configured such that spring 104 provides an outward bias on pin 102, to urge the outer end portion of pin 102 outwardly beyond outer surface 94 of clutch body 80. In this manner, when cap 86 and clutch body 80 are assembled, the outer end of each pin 102 is biased into engagement with inwardly facing surface 98 of cap outer portion 96. While one embodiment of the present invention utilizes a pair of passages 100 and associated pins 102 and springs 104, it is understood that any other satisfactory number of passages, pins and springs may be employed.

An arcuate, angled recess is formed in inwardly facing surface 98 of cap outer portion 96, defining a shallow bottom wall 106 and an end wall 108. Shallow bottom wall 106 angles inwardly from inwardly facing surface 98 at a relatively small angle, to provide a gradual transition between bottom wall 106 and inwardly facing surface 98. End wall 108 is oriented at a steep angle relative to inwardly facing surface 98. The recess defined by bottom wall 106 and end wall 108 is in alignment with the path of each pin 102 during rotation of clutch body 80 relative to cap 86.

A flexible drive member, in the form of a drive chain 110, is engaged with motor drive sprocket 64, drive roller sprocket 58 and knife actuating clutch sprocket 82. In this manner, driven nip roller 46 and knife assembly 52 are drivingly engaged with drive motor 50 for movement in response to operation of motor 50.

Figure 7:
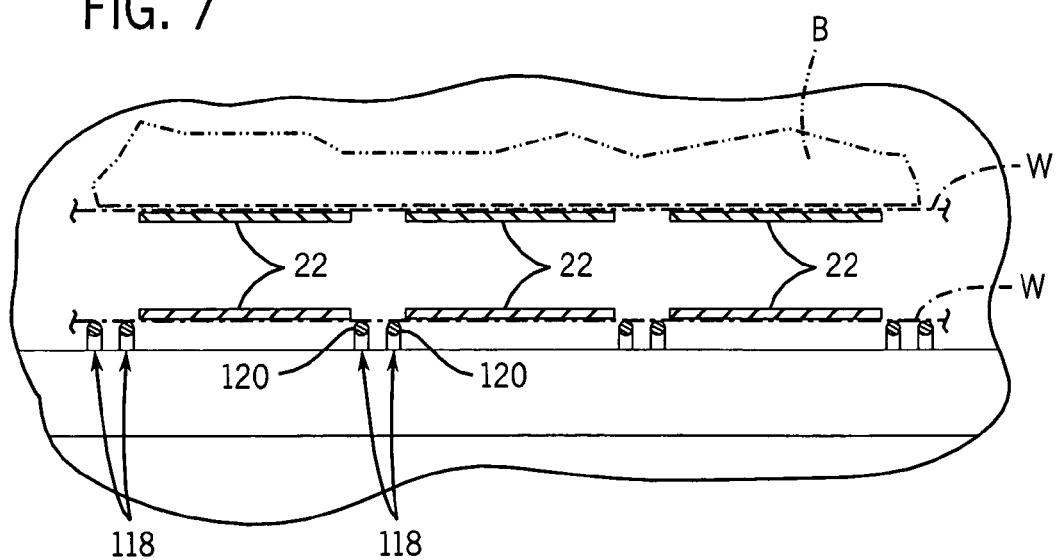
FIG. 7 is a partial section view taken along line 7—7 of FIG. 6.

A wrap material feeding arrangement is located below wrap material dispensing system 40, for advancing wrap material W into bale-forming chamber 24. As shown in FIGS. 6 and 7, the wrap material feeding arrangement includes a series of wrap material guide bars 118, each of which defines an inner section 120 and an outer section 122. Each inner section 120 is located in a space defined between an adjacent pair of baler belts 22. Guide bar inner sections 120 are located even with or slightly inwardly of the outwardly facing surfaces of the adjacent baler belts 22, to provide positive engagement of wrap material web W with baler belts 22. Guide bar outer sections 122 diverge outwardly from baler belts 22 in the vicinity of a lower roller 124 of baler 20, to define the convergent area or pinch point toward which the end of wrap material web W is advanced by operation of nip rollers 46, 48. Arcuate fingers 126 extend from the inner ends of guide bar inner sections 120, and have a contour that matches that of baler belts 22 adjacent crop inlet 32.

In operation, wrap material dispensing system 40 of the present invention functions as follows to apply wrap material to a formed bale, such as bale B (FIG. 5) to apply wrap material W to the outer periphery of bale B.

During normal operation, rotation of wrap material roll R is prevented by engagement of a brake assembly 112 with a disc member 114, which is engaged with wrap material roll R for rotation along with wrap material roll R. When bale B has been formed to its desired size, advancement of baler 20 is stopped so that no additional crop material is supplied to bale-forming chamber 24 by pickup mechanism 30. Bale B continues to rotate within bale-forming chamber 24 by virtue of continued movement of baler belts 22. Brake assembly 112 is released, and motor 50 is operated so as to rotate motor output shaft 62 in a first direction such that drive chain 110 imparts rotation to driven nip roller 46 in a clockwise direction with reference to FIG. 6 (in a counter-clockwise direction with reference to FIG. 4). Such rotation of driven nip roller 46 causes advancement of wrap material W, which is located between and engaged with nip rollers 46 and 48. Knife actuating clutch assembly 78 does not engage when clutch body 80 is rotated by drive chain 110 during such advancement of wrap material W. Rather, clutch body 80 spins freely relative to knife actuator shaft 72 by virtue of bushing 84, and pins 102 are moved along inwardly facing surface 98 of cap outer portion 96 in the direction of arrow 116 (FIG. 11). As pins 102 are moved in this manner, each pin 102 is forced outwardly into engagement with recess bottom wall 106 when the end of the pin 102 passes end wall 108. The end of pin 102 then rides along recess bottom wall 106, and returns into engagement with inwardly facing surface 98. In this manner, knife assembly 52 remains in its inoperative or rest position during advancement of wrap material W by operation of drive motor 50 to rotate motor output shaft 62 in the first direction of rotation. Knife assembly 52 is freely rotatable relative to end panels 44, such that knife assembly is gravity biased toward its rest position. The weight of knife assembly 52 is sufficient to resist any tendency to move knife assembly 52 to its operative position which may be caused by frictional engagement of the ends of pins 102 with the inwardly facing surface 98 of cap outer portion 96.

The end of wrap material web W is advanced toward the pinch point between baler belts 22 and outer sections 122 of wrap material guide bars 118. When the end of wrap material web W reaches the point of convergence between guide bars 118 and baler belts 22, the frictional engagement of wrap material web W with baler belts 22 functions to draw wrap material web W along with baler belts 20 toward crop inlet 32, where the end of wrap material W is moved into crop inlet 32 by arcuate fingers 126. The positioning of guide bar inner sections 120 in the spaces between baler belts 22 maintains wrap material web W in engagement with baler belts 22 to ensure that wrap material web W is advanced with baler belts 22.

Baler belts 22 move at a greater speed of advancement than that which is provided by operation of drive motor 50. When wrap material web W is advanced by engagement with baler belts 22, overrunning clutch 60 allows driven nip roll 46 to freewheel, such that wrap material web W is unwound from roll R and advanced at the rapid rate of advancement provided by balers belts 22. When this occurs, operation of drive motor 50 is discontinued, and wrap material web W is applied to the exterior of bale B during rotation of bale B within bale-forming chamber 24.

When a desired amount of wrap material web W has been applied to bale B, motor 50 is operated in a reverse direction, to rotate motor output shaft 62 in an opposite direction of rotation, i.e. clockwise with respect to FIG. 4 (counterclockwise with respect to FIG. 6). Overrunning clutch 60 allows such reverse movement of sprocket 58 relative to drive roller 46, since wrap material web W continues to be advanced at a rapid rate of advancement during such reverse operation of motor 50. Brake 112 is applied to clamp disc member 114, and to prevent further rotation of roll R. This functions to provide tension in wrap material web W.

Figure 9:
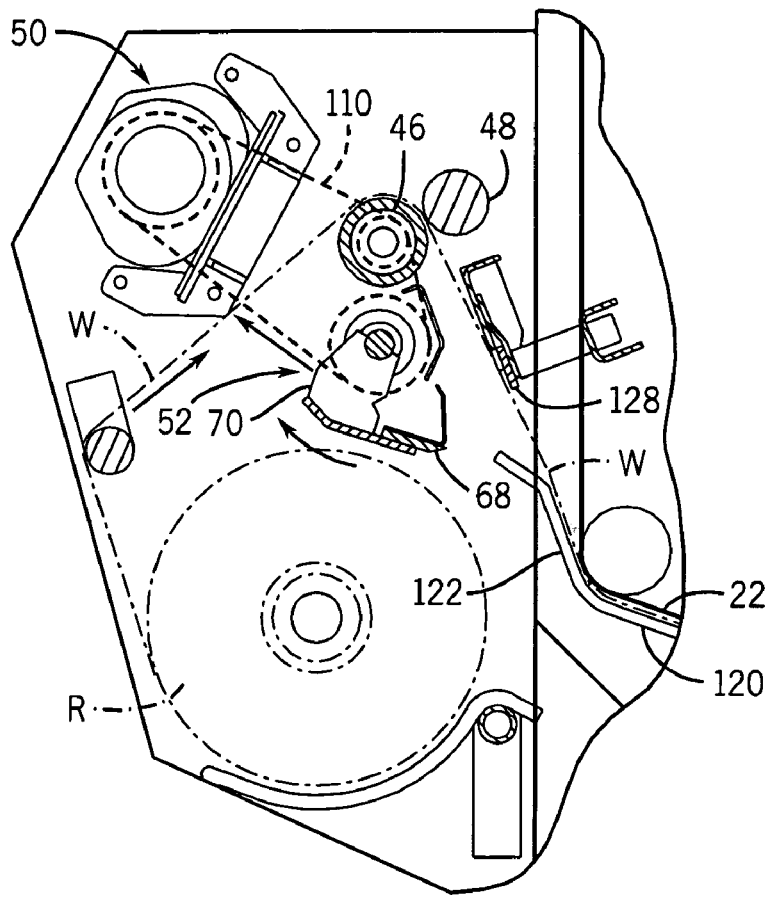
FIG. 9 is a partial section view taken along line 9—9 of FIG. 4, showing the knife member in a rest position.
Figure 12:
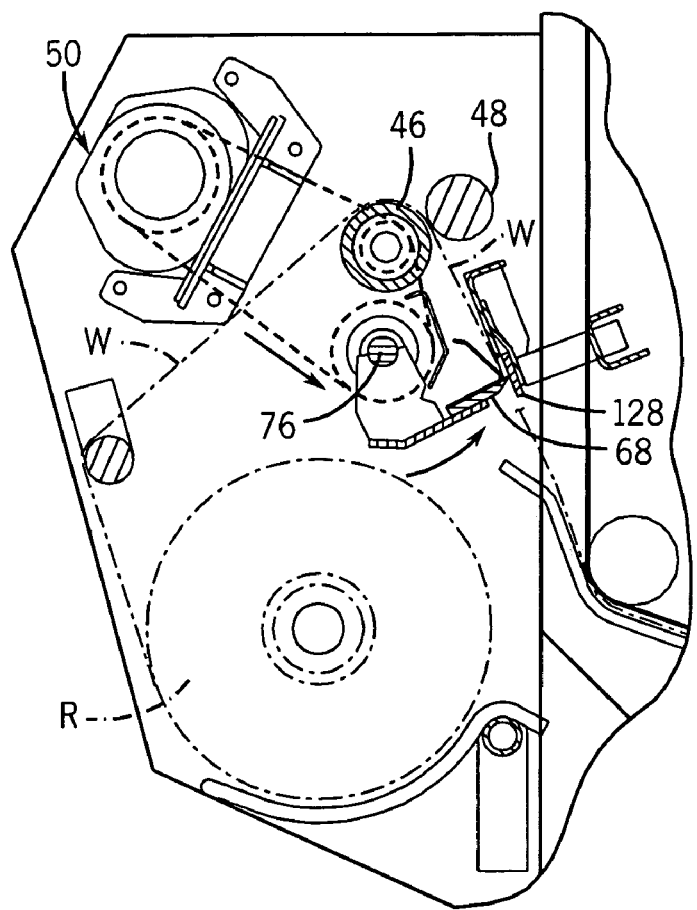
FIG. 12 is a view similar to FIG. 9, showing the knife member moved to a cutting position.
Figure 13:
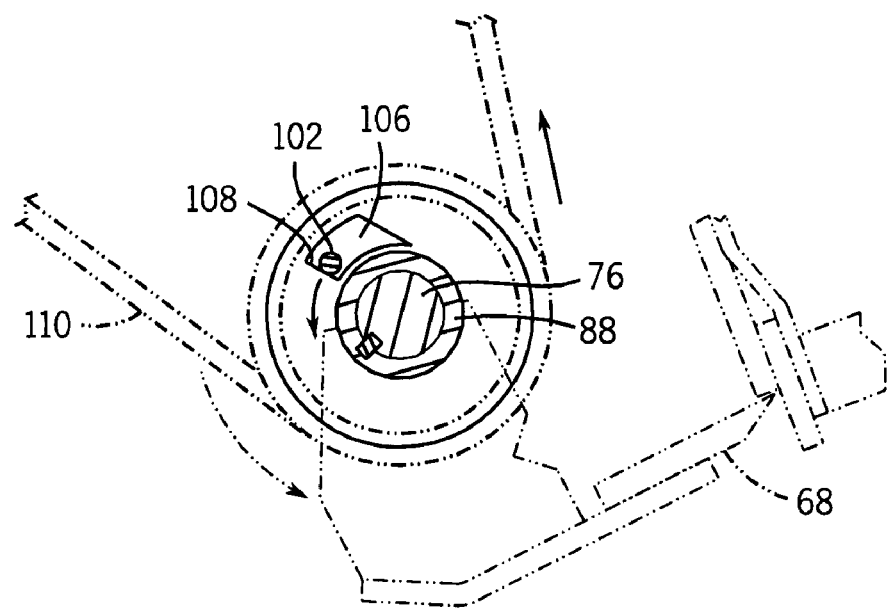
FIG. 13 is a view similar to FIG. 10, showing engagement of the knife actuating clutch mechanism to move the knife arrangement from its rest position of FIG. 9 to its cutting position of FIG. 12.

When motor 50 is operated in the reverse direction in this manner, the pins 102 of knife actuating clutch assembly 78 are moved in the direction of arrow 126 (FIG. 11), to engage the end portion of one of pins 102 with recess end wall 108. This functions to engage clutch body 80 and cap 86 together, to impart rotation to cap 86 of knife actuating clutch assembly 78 along with clutch body 80 in response to such reverse movement of drive chain 110. Since knife actuator shaft extension 76 and cap 86 are engaged with each other, rotation of cap 86 in this manner causes knife actuator shaft 72 to rotate so as to move knife member 68 from its rest position as shown in FIGS. 9 and 10 to its cutting position as shown in FIGS. 12 and 13, in which the sharpened edge of knife 86 is moved into contact with wrap material web W. An anvil 128 is located adjacent the path of wrap material web W, and is configured to provide a surface against which the sharpened edge of knife 86 is engaged, to assist in severing wrap material web W. In this manner, wrap material web W is severed, and the trailing end of wrap material web W is advanced by baler belts 22 to be wrapped onto bale B. Subsequent to severing of wrap material web W, motor 50 is operated to rotate motor output shaft 62 slightly in the first direction of rotation, to allow knife assembly 52 to return by gravity to the rest position of FIGS. 9 and 10 in preparation for a subsequent wrapping operation.

While the invention has been shown and described with respect to a specific embodiment, it is understood that various alternatives and modifications are possible and are contemplated as being within the scope of the present invention. For example, and without limitation, while a chain and sprocket system is illustrated as the mechanism by which the wrap material drive roller and the knife actuating clutch are driven in response to operation of drive motor 50, it is also understood that a belt-type or gear-type drive system may be employed. Further, while knife actuating clutch assembly 78 is illustrated as an axial pin clutch, it is understood that any other type of one-way clutch mechanism may be employed to move knife assembly 52 from its rest position to its cutting position upon reversal in the direction of operation of the drive motor. It is also understood that the particular arrangement of the components of wrap material dispensing system 40 may vary from that which is shown and described. Further, wrap material dispensing system 40 may be mounted in any satisfactory location on baler 20, and need not necessarily be mounted to the baler tailgate 34.

Various alternatives and embodiments are contemplated as being within the scope of the following claims particularly pointing out and distinctly claiming the subject matter regarded as the invention.

We claim:

1. A method of advancing wrap material in a round baler, comprising the steps of:
   selectively operating a wrap material drive arrangement in a first direction to dispense wrap material from a wrap material supply; and
   selectively operating the wrap material drive arrangement in a second direction opposite the first direction, wherein the wrap material drive arrangement is interconnected with a cutting arrangement that is movable between a rest position and a cutting position, wherein the wrap material drive arrangement is configured to maintain the cutting arrangement in the rest position when the drive arrangement is operated in the first direction, and to move the cutting arrangement from the rest position to the cutting position when the drive arrangement is operated in the second direction.

2. The method of claim 1, wherein the cutting arrangement includes a knife member interconnected with a pivotable shaft, wherein operation of the wrap material drive arrangement functions to cause movement of the pivotable shaft to move the cutting arrangement from its rest position to its cutting position upon operation of the wrap material drive arrangement in the second direction.

3. The method of claim 2, wherein the pivotable shaft is interconnected with a one-way clutch arrangement that rotates freely relative to the pivotable shaft when the wrap material drive arrangement is operated in the first direction, and which provides engagement with the pivotable shaft when the wrap material drive arrangement is operated in the second direction.

4. The method of claim 3, wherein the wrap material drive arrangement includes a motor having an output member, and wherein the steps of selectively operating the wrap material drive arrangement in the first direction and in the second direction are carried out by operating the motor to drive the output member in either a first or a second direction of rotation.

5. The method of claim 4, wherein the wrap material drive arrangement includes a rotatable drive roller engaged with the wrap material such that operation of the motor to rotate the rotatable output member in the first direction is operable to advance the wrap material.

6. The method of claim 5, wherein the output member is engaged with the rotatable drive roller and with the one-way clutch arrangement by means of a flexible drive member that imparts rotation to the one-way clutch arrangement and the rotatable drive roller in response to rotation of the output member.

7. A net material dispensing system for a round baler having a movable belt arrangement that defines a bale-forming chamber in which a round bale of crop material is formed, wherein the net material is carried on a rotatable roll, comprising;
   a net material advancement arrangement including a drive arrangement with which the net material is engaged for advancing a leading end of the net material, wherein the drive arrangement is driven in response to operation of a motor having a rotatable output member; and
   a selectively operable cutting arrangement for selectively cutting the net material, including a knife member movable between a rest position and a cutting position, and a knife member actuation system for selectively moving the knife member from its rest position to its cutting position;
   wherein the motor is operable to rotate the output member in a first direction for driving the drive arrangement to advance the net material, and wherein the knife member actuation system is operable in response to operation of the motor to rotate the output member in a second direction opposite the first direction to move the knife member from its rest position to its cutting position.

8. The net material dispensing system of claim 7, wherein the knife member is carried by a pivotable shaft, and wherein the knife member actuation system includes a knife actuating clutch mechanism interconnected with the pivotable shaft, wherein the knife actuating clutch mechanism is operable in response to rotation of the output member in the second direction to cause pivoting movement of the pivotable shaft to move the knife member from its rest position to its cutting position.

9. The net material dispensing system of claim 8, wherein the output member is drivingly engaged with a flexible drive member that provides input power to the net material advancement arrangement when the motor is operated to rotate the output member in the first direction, and wherein the flexible drive member is engaged with the knife actuating clutch mechanism to move the knife member from its rest position to its cutting position when the motor is operated to rotate the output member in the second direction.

10. The net material dispensing system of claim 9, wherein the knife actuating clutch mechanism comprises a one-way clutch mechanism with which the flexible drive member is engaged, wherein the one-way clutch mechanism is engaged with the knife member when the motor is operated to rotate the output member in the second direction, and wherein the one-way clutch mechanism spins freely without engagement with the knife mechanism when the motor is operated to rotate the output member in the first direction.

11. The net material dispensing system of claim 10, wherein the flexible drive member comprises a drive chain, and wherein the output member and the one-way clutch mechanism include sprockets with which the drive chain is engaged.

12. The net material dispensing system of claim 1, wherein the net material advancement arrangement comprises a pair of nip rollers between which the wrap material is received, wherein a first one of the nip rollers is drivingly engaged with the output member for imparting rotation to the nip rollers in response to operation of the motor to advance the wrap material between the nip rollers.

13. The net material dispensing system of claim 12, wherein the knife member actuation system includes an actuating clutch interconnected with the knife member, and wherein the output member is engaged with a flexible drive member which is drivingly engaged with the actuating clutch, the output member and the first nip roller to selectively impart rotation thereto in response to operation of the motor.

14. A drive system for dispensing wrap material onto a formed bale in a round baler, comprising:
 wrap material advancement means engaged with wrap material to be applied to the bale for advancing the wrap material toward the bale;
 cutting means including a knife member movable between an operative position and an inoperative position;
 reversible drive means having an output member that is movable in either a first direction or a second direction, wherein movement of the output member in the first direction functions to operate the wrap material advancement means to advance the wrap material toward the bale, and wherein movement of the output member in the second direction functions to operate the cutting means to move the knife member from the inoperative position to the operative position.

15. The drive system of claim 14, wherein the cutting means includes actuating clutch means which is operable to maintain the knife member in the inoperative position when the output member is moved in the first direction, and to provide movement of the knife member to the operative position when the output member is moved in the second direction.

16. The drive system of claim 15, wherein the wrap material advancement means includes a drive roller with which the wrap material is engaged, and further comprising overrunning clutch means interposed between the drive roller and the reversible drive means to enable the output member to be moved in the second direction while wrap material is being advanced by the wrap material advancement means.

* * * * *